United States Patent [19]

Yamada et al.

[11] Patent Number: 5,507,182
[45] Date of Patent: Apr. 16, 1996

[54] SEMICONDUCTOR ACCELEROMETER WITH DAMPERLESS STRUCTURE

[75] Inventors: Toshitaka Yamada, Nagoya; Masahito Imai, Chita; Akira Tai, Kasugai, all of Japan

[73] Assignee: Nippondenso Co., Ltd., Kariya, Japan

[21] Appl. No.: 198,052

[22] Filed: Feb. 18, 1994

[30] Foreign Application Priority Data

| Feb. 18, 1993 | [JP] | Japan | 5-029356 |
| Apr. 9, 1993 | [JP] | Japan | 5-107688 |
| Apr. 9, 1993 | [JP] | Japan | 5-107689 |

[51] Int. Cl.⁶ ............................. G01P 15/08
[52] U.S. Cl. ..................... 73/504.03; 73/504.15
[58] Field of Search ............. 73/517 R, 517 AV, 73/517 B, 504.3

[56] References Cited

U.S. PATENT DOCUMENTS

| 3,636,752 | 1/1972 | Ishii | 73/517 R |
| 4,891,985 | 1/1990 | Glenn. | |
| 4,967,605 | 11/1990 | Okada. | |
| 5,003,824 | 4/1991 | Fukada et al. | 73/517 R |
| 5,060,504 | 10/1991 | White et al. . | |
| 5,115,291 | 5/1992 | Stokes | 73/517 AV |
| 5,189,914 | 4/1993 | White | 73/599 |
| 5,331,854 | 7/1994 | Hulsing, II | 73/517 AV |

FOREIGN PATENT DOCUMENTS

| 63-206663 | 8/1988 | Japan . |
| 1059075 | 3/1989 | Japan . |
| 3107769 | 5/1991 | Japan . |

OTHER PUBLICATIONS

Koide et al, "A Multistep Anisotropic Etching Process For Producing 3-D Silicon Accelerometers", Technical Digest of the 11th Sensor Symposium, 1992, pp. 23-26.

Terry et al, "A Miniature Silicon Accelerometer With Built-In Damping", IEEE Solid-State Sensor and Actuator Workshop, 1988, pp. 1-3.

*Primary Examiner*—Richard Chilcot
*Assistant Examiner*—Max Noori
*Attorney, Agent, or Firm*—Cushman, Darby & Cushman

[57] ABSTRACT

A semiconductor accelerometer which can satisfy the requirements of both the sensitivity and the fracture strength without any contrivance for providing viscous liquid and beam stopper material is provided. A casing comprises a stem and a shell. The casing houses an accelerometer chip. The silicon accelerometer chip is of double cantilever beam structure. Each beam is provided with piezo resistance layers. The motion of the beams due to the action of acceleration is converted into electrical signals. The resonant frequency of the beams of the accelerometer chip is above the resonant frequency of the casing itself, so that the acceleration components above this resonant frequency are damped by the casing and therefore most acceleration components in the resonant frequency of the beam are damped. As a result, the beams of the accelerometer chip can be protected from the impacts due to the dropping of the accelerometer, or the like.

35 Claims, 12 Drawing Sheets

SEMICONDUCTOR ACCELEROMETER WITH DAMPERLESS STRUCTURE

BACKGROUND OF THE INVENTION

1. Field of the Invention

The present invention generally relates to a semiconductor accelerometer. More particularly, the present invention relates to a semiconductor accelerometer in which an accelerometer chip is housed within a casing.

2. Description of the Related Arts

Conventional accelerometers can be classified into piezo type, electrostatic capacity type and metal strain type by the method of converting acceleration into electric signals. Irrespective of these types, however, the structure thereof is commonly composed of a proof mass and a plurality of beams to suspend the proof mass. In general reference to the structure of a beam, the thicker the beam part is, the higher the static fracture strength, but the lower the sensitivity is; reversely, the thinner the beam part is, the higher the sensitivity is, but the lower the static fracture strength is. This indicates the difficulty in having high the sensitivity and at the same time high static fracture strength. In order to achieve a desired level of sensitivity, therefore, the static fracture strength has to be sacrificed, and in order to compensate for the sacrificed static fracture strength, some countermeasures have to be taken, such as filling the casing with some viscous liquid, providing some stopper material to prevent excessive deformation of the beam and providing some buffer material to the outer periphery of the casing to prevent the transmission of impacts to the beam (as disclosed in the Japanese Patent Unexamined Publication Nos. 64-59075, 3-107769 and 63-206663 and the U.S. Pat. No. 5,060,504).

However, as these countermeasures require contrivances to provide some viscous liquid or some beam stopper material, the materialization of a semiconductor accelerometer which does not require any viscous liquid or any beam stopper material has been awaited.

SUMMARY OF THE INVENTION

Accordingly, it is the primary object of the present invention to provide a semiconductor accelerometer which can satisfy both high sensitivity and high fracture strength without using any viscous liquid or any beam stopper material.

When no viscous liquid or no stopper material is used, particularly the fracture strength as described in the above must be increased. The most important things to be considered regarding the fracture strength in designing a semiconductor accelerometer is the improvement of the fracture strength against overacceleration applied thereto in practical uses, i.e., the improvement of the static fracture strength. However, as a result of the experiments repetitively conducted by the inventor et al, it was found that, if no viscous liquid or no stopper material was used, impacts due to dropping of the accelerometer, or the like, would be applied thereto, and the impacts would be transmitted straight to the thin beams within then accelerometer chip, which would result in the fracture of the accelerometer, and that this type of fracture was the dominant. This type of fracture is a fracture caused by the resonance of the beams with the impacts applied from the outside. The beam in oscillation at the resonant frequency vibrates as if driven by Q times as strong an input as the actual input due to the coefficient of self-amplification (generally, Q value) with respect to an input of "1." If the stress caused by oscillation driven by the Q-time stronger input exceeds the yield stress of the base material of the beams (for quasi-complete elastic body, such as silicon, yield stress is almost equal to-fracture stress), the beams will be fractured.

If the fracture strength is increased by Q times, the sensitivity will decrease as described in the above to such an extent that the accelerometer output (in proportion to the generated stress) will decrease to be 1/Q. Therefore, in order to amplify the accelerometer output to the output voltage required for the system by using an amplifier, an amplification factor of Q times as much as the conventional level is required. If this much amplification factor can be achieved, there will be no problem. In reality, however, due to noise peculiar to each device used for an amplifier (1/f noise, etc.), a special measure should be taken, or otherwise, due to the maximum amplification limited to thousands times, it would be impossible for an accelerometer which can not be fractured without using any damping material or the like to achieve the required amplification factor of more than ten thousands times.

On the other hand, as a means to improve the accelerometer beam output itself, it is conceivable that the efficiency of the conversion element itself is improved. For example, in an accelerometer which uses the semiconductor piezo resistance effect, the coefficient of piezo resistance may be improved by reducing the doping amount of impurities into the piezo resistors themselves. If, however, the doping amount of impurities is excessively reduced, though the coefficient of piezo resistance effect itself will increase, the secondary non-linear components of the coefficient will increase, a problem will be caused that the linear characteristics of the accelerometer can not be achieved. Furthermore, in an accelerometer of electrostatic capacity type, countermeasures to increase the total area of electrodes disposed in opposition to each other, reduce the distance between these two electrodes, etc. are conceivable. Any practical data, however, have not yet been obtained from these countermeasures.

For these reasons, the improvement of the conversion efficiency is also limited, and it is impossible to achieve a "non-fracture accelerometer using no damping material" by the improvement of the conversion efficiency alone.

In order to solve the above problem, the inventer et al of the present invention have investigated for measures to reduce the required beam strength, and succeeded in obtaining an accelerometer which has high fracture strength without using any damping material or the like and at the same time the desired high sensitivity by providing the contrivances described in the following passages.

Firstly, the inventor et al of the present invention focused their efforts on the improvement of a casing which houses an accelerometer. Being a structure, the casing transmits impacts upon the receipt thereof, and the casing itself resonates with the impacts. Normally, however, the casing is of box shape, and the resonant frequency thereof is not so high due to large mass thereof, and the resonant Q value is comparatively small. Generally speaking, the impact components above the resonant frequency can not completely be transmitted, and characteristically, the higher the resonant frequency is, the more the impacts are damped. In a resin casing, such as a plastic casing, as the Young's modulus (which is a physical property value indicating the elasticity of a substance) is small, the transmission frequency due to impacts is damped at a frequency lower than the resonant frequency of the casing itself. That is, in the accelerometer according to the first aspect of the present invention, the resonant frequency of the beams is set in relation to the damping zone of the resonant frequency of the casing or transmission frequency.

Furthermore, the inventor et al of the present invention focused their efforts on the structure of the beams. As illustrated in FIGS. 12A and 12B, in the conventional semiconductor accelerometer, the proof mass and the beams are separated from the semiconductor substrate and the beams are thinned by anisotropic etching. In the recessed structure shaped by means of etching, as the corner parts are subjected to intensive stress according to the dynamic principle, the maximum stress parts on the beams are identified with the parts denoted by the numeral 23 in FIG. 12A. Therefore, if piezo resistors are formed at these parts, a highly sensitive accelerometer can be obtained. Though, however, due to difficulty in process to form piezo resistors at these parts, as a typical alternative, piezo resistors are formed at the parts denoted by the numeral 22 in FIG. 12A, which are located immediately at the rear side of the corresponding parts.

Impossibility of detecting the maximum value of the stress on the beam as described in the above means incomplete use of the generated stress and low efficiency. Furthermore, in case of an excessive input in the detection of acceleration, even if it is judged safe from the detection signals, actually, it may fracture the beams. In order to solve this problem, a reinforcement measure by providing R to the beam root parts has been disclosed (A. Koide et al: Technical Digest of the 11th Sensor Symposium, 1992, pp. 23–26). Although this is a good countermeasure, still there is a problem that a complicated etching process is required to form a semiconductor into such shape.

Accordingly, the inventor et. al of the present invention have conceived that, in terms of the mitigation of stress applied to the beams themselves, the beam should be so structured that stress is not applied so intensively at the parts where piezo resistors are formed. Therefore, it is the second aspect of the present invention to provide a semiconductor accelerometer in which the boundary between the thin part and the thick parts viewed in the cross section and from top are displaced from the end parts of the outlines of the proof mass and beams.

The accelerometer according to the first aspect of the present invention is featured by the assembly structure thereof. The accelerometer comprises an accelerometer chip of beam structure and a casing for housing the accelerometer chip, and is characterized by an arrangement that the resonant frequency of the beams of the accelerometer chip is set to be above the frequency of the casing itself within the damping zone for impact transmission.

The accelerometer according to the second aspect of the present invention is featured by the accelerometer chip structure thereof. The accelerometer comprises beams for suspending a proof mass and piezo resistors disposed on the beams, and is characterized by an arrangement that the piezo resistors are longitudinally disposed along the beams at the end parts thereof, thin parts as thin as the beams are formed at the end parts of the beams as if continuously extended to the beams, and the thin parts are wider sidewards than the beams.

Furthermore, the accelerometer according to the third aspect of the present invention is characterized in that the accelerometer chip according to the second aspect of the present invention is combined with the assembly structure according to the first aspect of the present invention. It is a semiconductor accelerometer with an accelerometer chip having beams housed within a casing, and characterized by an arrangement that the resonant frequency of the beams is above the frequency of the casing itself within the damping zone for impact transmission, and thin parts which are the same in thickness as but wider sidewards in width than the beams.

According to the first aspect of the present invention, the resonant frequency of the beams of the accelerometer chip is set to be within the frequency zone in which the casing does not transmit all the generated impacts. For this arrangement, in the impact acceleration transmitted to the beams, the input of the frequency components corresponding to the resonant frequency of the beams becomes small. As a result, the required beam strength can practically be lowered. Accordingly, it is possible to provide an accelerometer which is not fractured at the resonant frequency without using any damping material or stopper material while maintaining the required sensitivity.

That is, of all the beam fractures, as the resonance fracture caused by an impact due to dropping of the accelerometer, or the like, is dominant, by considering the impact transmission due to the dropping of the accelerometer and setting the fracture strength required for the accelerometer in relation to the frequency characteristics so that the resonant frequency can be absorbed by the casing, the beams can be protected from the resonance fracture without using any viscous liquid or any beam stopper material.

On the other hand, according to the second aspect of the present invention, by forming the thin parts continuously to the beams, the stress intensively applied to the corner parts of the conventional recessed parts can be dispersed to the root parts or in the side directions of the thin parts. This arrangement reduces the difference in stress value between the stress at the piezo resistor formed side and the maximum stress parts (corner parts), i.e., the intensive stress is reduced and the resistivity of the beams to fracture stress is improved.

The improved resistivity of the beams to the fracture stress means the improved strength of the beams. Due to the improved strength, the beam thickness can be reduced at the same strength, and resultantly even slight acceleration signals can be detected and the sensitivity can be improved. In other words, this means the improved strength at the same sensitivity, and the improved sensitivity at the same strength.

Moreover, according to the third aspect of the present invention, by setting the resonant frequency of the beams of the accelerometer chip to be within the frequency zone in which all the generated impacts are not transmitted to the casing, the input of the resonant frequency components of the impact acceleration to be transmitted to the beams can be reduced. Furthermore, by forming the thin parts continuously to the beams, the stress intensively applied to the corner parts of the conventional recessed parts can be dispersed to the root parts or in the side directions thereof. Owing to these effects working together, a semiconductor accelerometer which has both high sensitivity and high fracture strength at the same time without using any damping material or any stopper material.

DETAILED DESCRIPTION OF THE EMBODIMENTS

Figure 1:
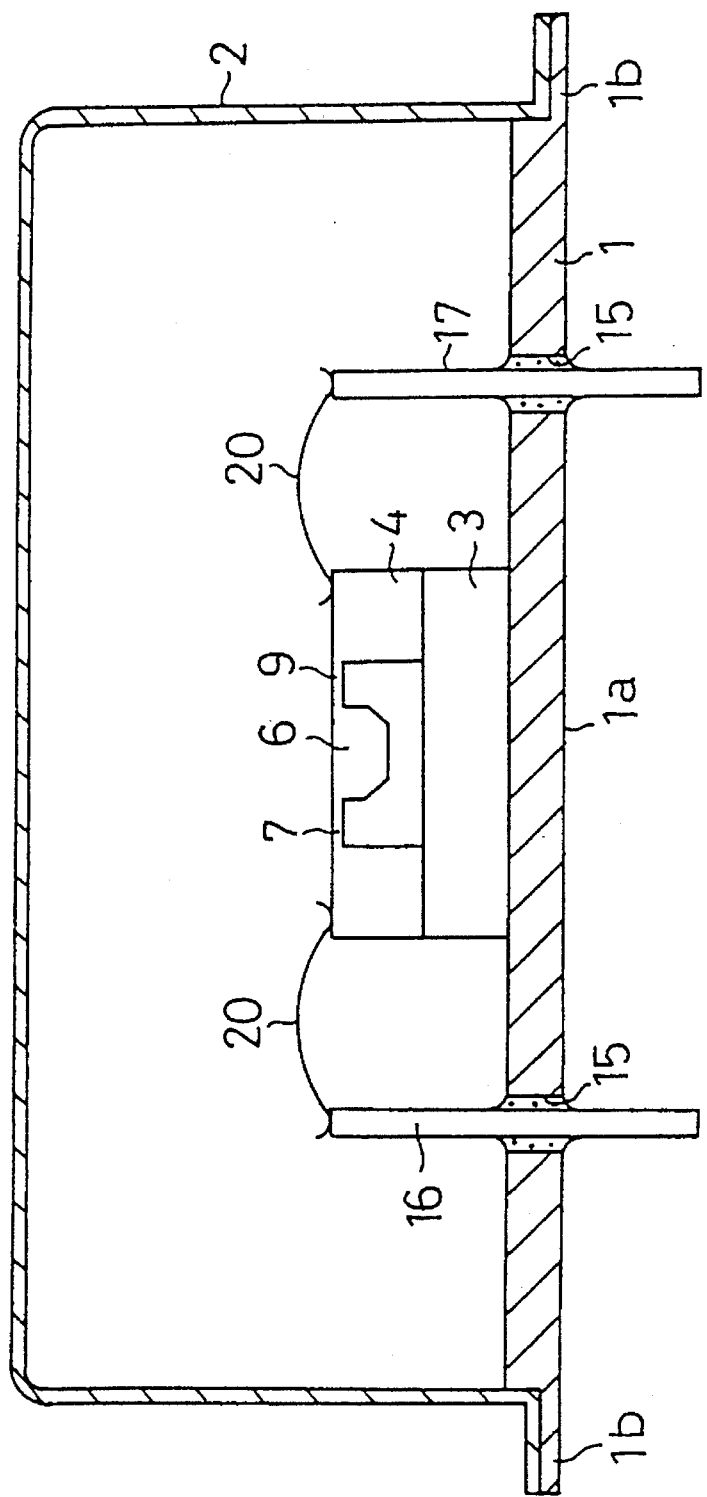
FIG. 1 is a cross-sectional view illustrating a semiconductor accelerometer of the first embodiment according to the present invention.

Embodiments according to the present invention are described referring to the drawings attached hereto.

Figure 2:
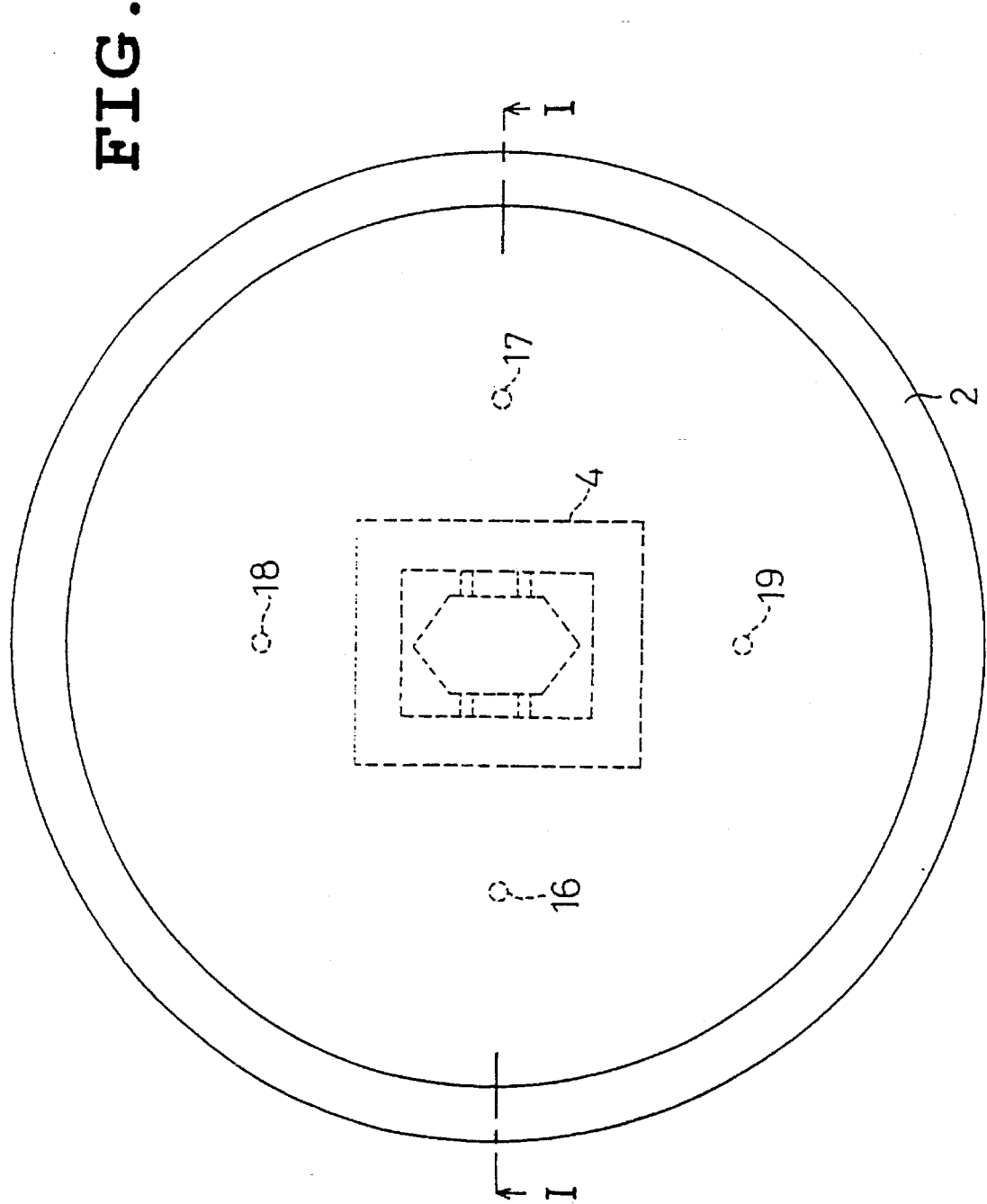
FIG. 2 is a plan view illustrating the semiconductor accelerometer illustrated in FIG. 1.

FIG. 2 is a plan view of a semiconductor accelerometer assembly, and FIG. 1 is a cross-sectional view thereof taken along the line I—I.

A stem 1 is made of cold rolled steel sheet (SPC) into a shape of disk. This stem 1 consists of a thick part 1a at the central part thereof and a thin part 1b at outer peripheral thereof. The stem 1 of this embodiment is dimensioned to 16 mm in outside diameter, 1.5 mm in the thickness of the thick part 1a and 0.5 mm in the thickness of the thin part 1b.

This stem 1 is provided with a shell 2 as a cap material. The shell 2 is made of SPC, and airtightly welded at the outer periphery to the thin part 1b of the stem 1. In this embodiment, the shell 2 is dimensioned to 14 mm in the outside diameter of the upright part, 5 mm in height and 0.35 mm in thickness.

The stem 1 and the shell 2 compose a casing.

Figure 3:
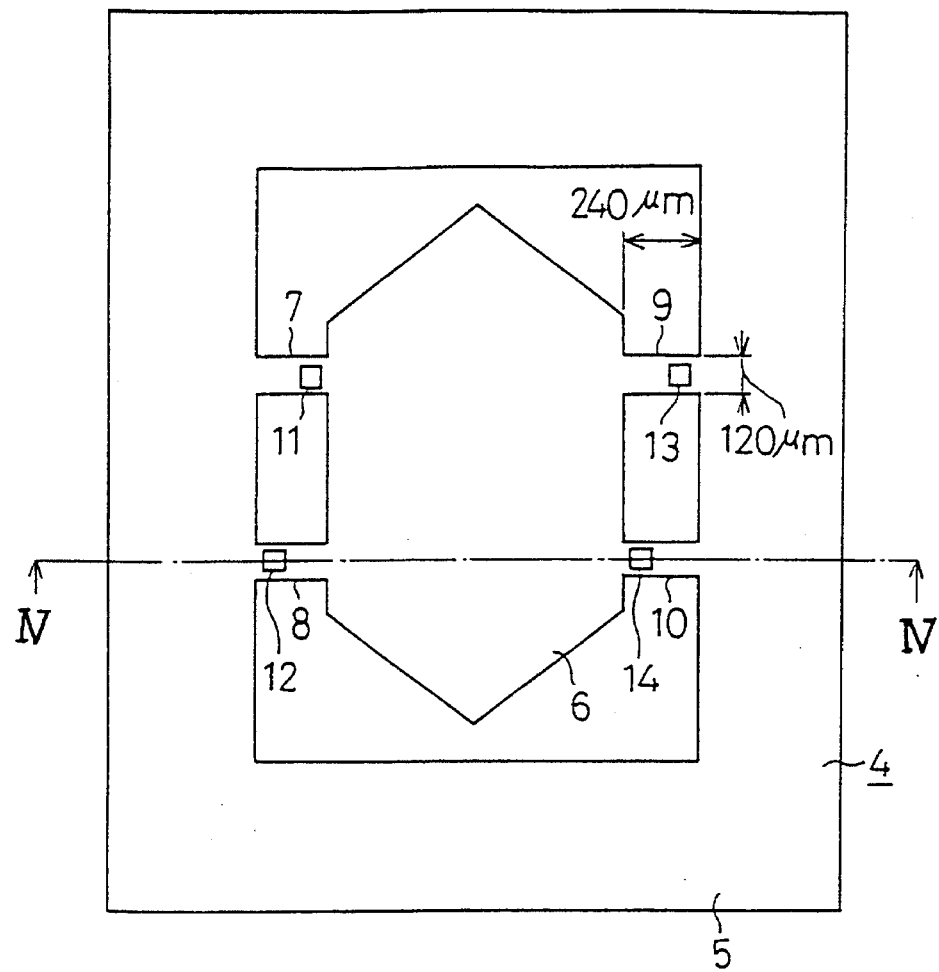
FIG. 3 is a plan view illustrating an accelerometer chip.
Figure 4:
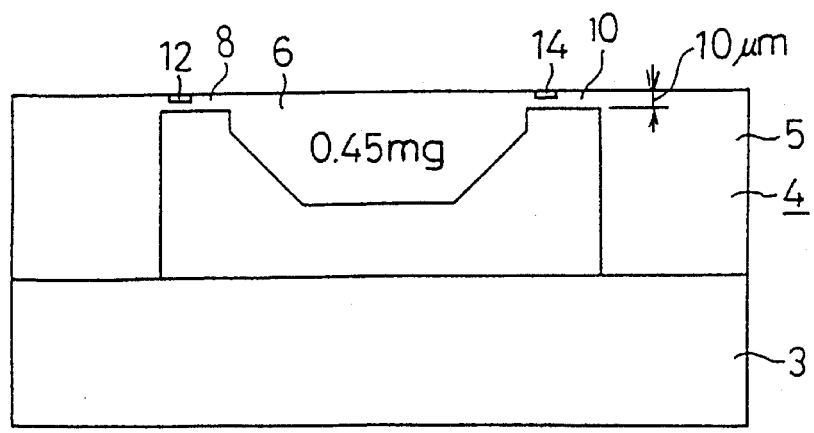
FIG. 4 is a cross-sectional view illustrating the accelerometer chip taken along the line IV—IV in FIG. 3.

The thick part 1a of the stem 1 within the casing is connected with a pedestal 3, and the pedestal 3 is mounted with an accelerometer chip 4 which is made of silicon. Now, detail description is given to this accelerometer chip 4. FIG. 3 is a plan view illustrating the accelerometer chip 4, and FIG. 4 is a cross-sectional view of the same illustrated in FIG. 3 taken along the line IV—IV.

The accelerometer chip 4 formed into a shape of rectangle, including a fixing part 5 formed into a shape of square frame. The accelerometer chip 4 is connected to the top of the pedestal 3 through this fixing part 5. A proof mass 6 is arranged within the fixing part 5 of the square frame, and the fixing part 5 and the proof mass 6 are fixedly connected together through four pieces of beams 7 through 10. These four beams 7 through 10 project from both sides, two from each side, to the proof mass 6, forming a double cantilever beam structure. Both the fixing part 5 and the proof mass 6 are formed of thick parts, while the beams 7 through 10 are formed of thin parts.

The beams 7, 8, 9 and 10 include piezo resistance layers (i.e., impurity diffused layers) 11, 12, 13 and 14 respectively whose resistance values vary according to the deformation of the beams 7, 8, 9, and 10. In this embodiment, the proof mass 6 is 0.45 mg in mass, the beams 7 through 10 are 120 μm in width, 240 μm in length and 10 μm in thickness respectively.

In the above design arrangement, the resonant frequency (i.e., primary resonant frequency) of the beams 7 through 10 of the accelerometer chip 4, f, is set to 22 kHz, while the detection frequencies of the accelerometer chip 4 ranges from 10 Hz to 1,000 Hz.

As illustrated in FIGS. 1 and 2, four pieces of lead terminals 16, 17, 18 and 19 penetrates the stem 1 through respective through-holes 15 and airtightly sealed with glass material therethrough. The lead terminals 16 through 19 are electrically connected to the accelerometer chip 4 with wires 20 respectively within the casing.

Figure 5:
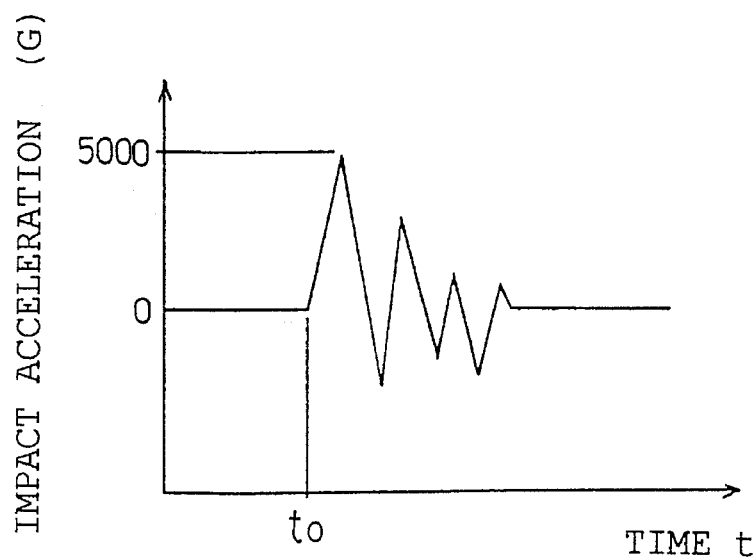
FIG. 5 is a characteristic diagram illustrating the transient condition with impact acceleration applied.
Figure 6:
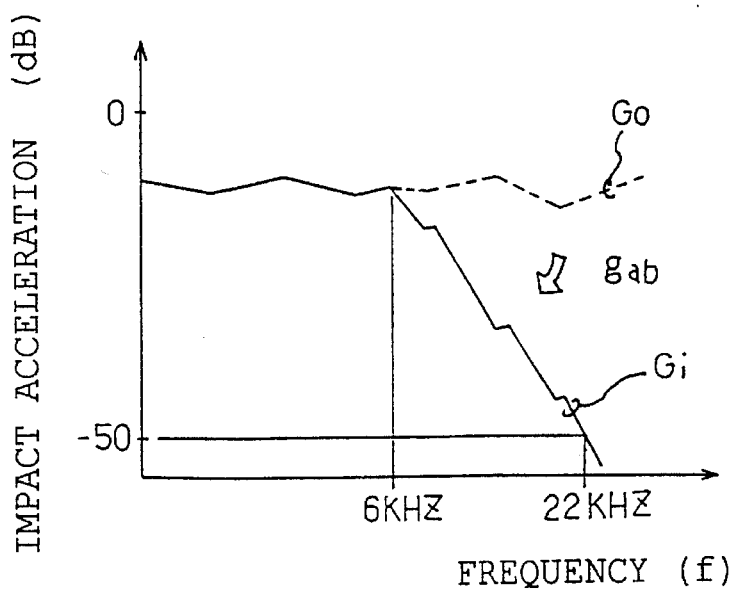
FIG. 6 is a characteristic diagram illustrating the frequency characteristics of the transmitting impacts.

If the semiconductor accelerometer assembly in the above arrangement is dropped, impact acceleration (maximum 5,000 G) would be applied thereto as illustrated in FIG. 5, where $t_o$ denotes the time of dropping. FIG. 6 illustrates the frequency characteristics of the impacts which then transmit, where a solid line Gi denotes the impact applied to the accelerometer chip 4, a broken line Go denotes the impacts acceleration caused by the dropping, and an arrow gab denotes the absorption of the impacts caused by the metal casing. From this figure, it is learned that the resonant frequency of the metal casing itself is 6 kHz, that the resonant frequency of the beams 7 through 10 of the accelerometer chip 4, f, is 22 kHz which is higher than the resonant frequency of the metal casing itself, 6 kHz, and that the frequency components higher than 6 kHz are damped by the metal casing and then the balance frequencies are transmitted to the accelerometer chip 4.

As a result, the resonant frequency (22 kHz) components of the impact acceleration are mostly damped to −50 dB (by approx. 1/320 of the maximum acceleration of the drop impacts at 22 kHz or approx. 15 G in absolute value). This protects the beams 7 through 10 of the accelerometer chip 4 from fracture caused by the impacts due to the dropping of the accelerometer assembly, or the like. That is, the impacts caused by the dropping of the accelerometer, or the like, is not transmitted with high frequency components due to loss through the package materials and connection parts. Therefore, by setting the resonant frequency of the accelerometer chip 4, f, to be within this high frequency zone, resonant fracture can be avoided.

Specifically, when the strength of each beam of the accelerometer chip 4 is set to be equal to or larger than the product of Q at the resonant frequency (Q≈1,000 in this accelerometer) multiplied by the acceleration components of the frequency equal to the resonant frequency of the beams among of all the drop impacts, where Q≈1,000 in this accelerometer, the acceleration components (≈15 G) and the product (≈15,000 G), the resonant fracture of the accelerometer beams can be avoided.

Figure 7:
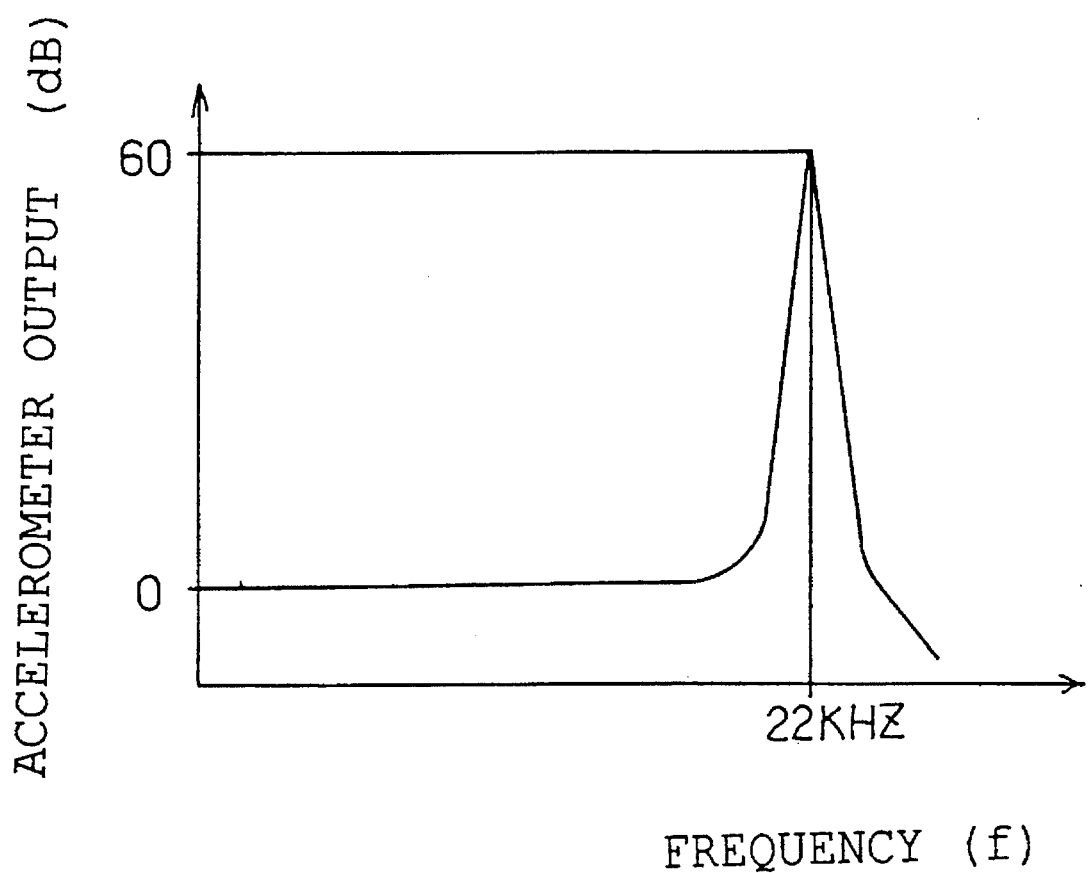
FIG. 7 is a characteristic diagram illustrating the output at the resonant frequency.

FIG. 7 illustrates the frequency characteristics of the accelerometer output. While the accelerometer output according to this embodiment is 0 dB within the detection frequency zone (from 10 Hz to 1,000 Hz), the same at the resonant frequency zone of the beams of the accelerometer chip 4 is 60 dB, indicating 1,000 times as much as the normal output.

Incidentally, in this embodiment, the available output sensitivity per G is 80 μV.

Each accelerometer chip beam may be dimensioned to 50 μm to 300 μm in length, 25 μm to 200 μm in width and 5 μm to 40 μm in thickness other than the dimensions described in the above.

In this embodiment, as described in the above, the accelerometer chip 4 is housed within the casing composed of the stem 1 and the shell 2, this accelerometer chip 4 is of a double cantilever beam structure, and the behaviors of the beams 7 through 10 due to the acceleration action are converted into electric signals through the piezo resistance layers 11 through 14. Here, the resonant frequency of the beams 7 through 10 of the accelerometer chip 4, f, is set to 22 kHz, which is equal to or higher than the resonant frequency of the impact transmission which the casing itself has (=6 kHz). In this way, the transmission of the case drop impact is considered in designing to avoid the resonant fracture of the accelerometer beams by having the fracture strength of the beams set in relation to the frequency characteristics, whereby the beam fracture can be avoided without using any beam stopper or any viscous liquid. That is, the frequency components equal to or higher than the resonant frequency of the casing, i.e., the frequency components equal to or higher than the maximum frequency of the case impact transmission, are damped to be low enough to be transmitted to the accelerometer chip 4, and, as a result, the fracture of the beams 7 though 10 of the accelerometer chip 4 can be avoided and the beams 7 through 10 of the accelerometer chip 4 can be protected from the resonant fracture. Accordingly, even when it is difficult to make both the sensitivity of the accelerometer itself and the resonant frequency (which is roughly equal to fracture strength) consistent with each other due to the required specifications of the accelerometer, the sufficiently high sensitivity and fracture strength can be achieved without filling the casing with any viscous liquid or providing the beams with any beam stopper not to allow the beams to be excessively deformed.

As described in the above, the resonance fracture can be avoided by properly setting the strength of the accelerometer chip 4. If, however, any frequency component which is equal to the resonant frequency of the beams is contained in the detection frequencies of the accelerometer chip 4 at the time of normal acceleration measurement, the accelerometer output is Q times (≈1,000) as much as such frequency components due to resonance. This may cause an error to the output signal.

In order to avoid such error, it may be necessary in designing to dull the frequency characteristics of an amplification circuit subsequently arranged so that the output signal error can be negligible unless the measured oscillation (impact) is lower than the resonant frequency of the beams of the accelerometer chip 4 and there is no frequency component which is equal to the resonant frequency.

Incidentally, in the above embodiment, as the casing which houses the accelerometer chip 4 is composed of the stem 1 and the shell 2, both of which is made of metal, the frequency zone in which the impact transmission by means of the casing is damped is higher than the resonant frequency zone of the casing itself. If, however, the case is made of some material which has smaller Young's modulus, such as plastic material, such frequency zone may be lower than the resonant frequency zone of the casing itself.

In such case, the resonant frequency of the beams of the accelerometer chip 4 should be set by considering the transmission frequency damping zone, as well as the resonant frequency of the casing itself.

Figure 8:
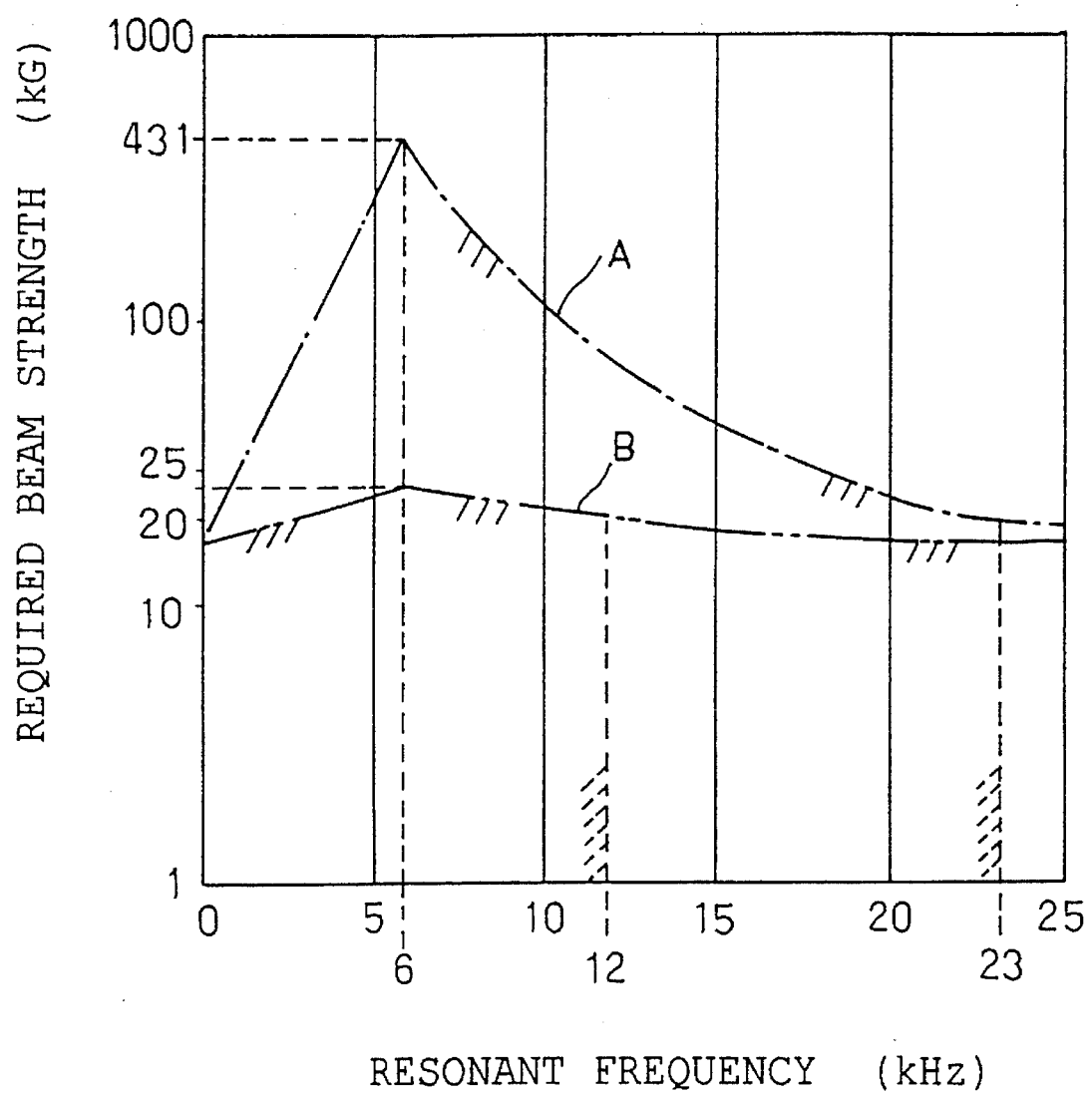
FIG. 8 is a characteristic diagram illustrating the relation between the required beam strength and the resonant frequency.

As a particularly effective method of such setting, as illustrated in FIG. 8, when the required strength of the beams of the accelerometer chip 4 (i.e., required beam strength) is P, the Q value of resonance is A(f) and the resonant frequency component of the acceleration applied through the casing is Gi(f), the required beam strength P may be set as following Equation (1).

$$P > A(f) \cdot Gi(f) \quad (1)$$

Incidentally, the characteristic diagram illustrated in FIG. 8 is a transformation of the following equation, Equation (2), which is obtained by using the above equation, Equation (1), where the statically required fracture strength is $G_{MAX}$, e.g., 9,000 G, and the factor of safety S (constant) is 2:

$$P = \{G_{MAX} + A(f) \cdot Gi(f)\} \cdot S \quad (2)$$

A characteristic line A in FIG. 8 illustrates a case with a cantilever beam structure and a characteristic line B illustrates a double cantilever beam structure according to this embodiment. In FIG. 8, the resonant frequency components of the acceleration applied to the beams through the casing are damped within the zone of frequency higher than the resonant frequency of the casing. Accordingly, the area above this characteristic line in FIG. 8 becomes expanding due to this damping, and even when the resonant frequency of the beams is set in the high frequency zone, the required minimum beam strength can be set by referring to FIG. 8. Also, as evident from FIG. 8, the beam strength required for the double cantilever beam structure may be lower than that required for the cantilever beam structure. That is, both the sensitivity and the fracture strength can be set compatible by considering the resonant frequency of the beams with respect to the resonant frequency of the casing by referring to FIG. 8 when beam structure is designed.

Figure 9A:
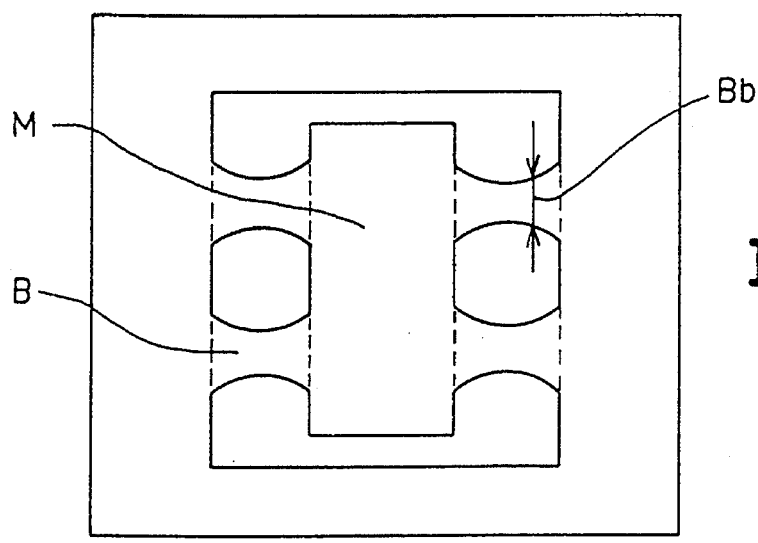
FIG. 9A is a plan view illustrating the accelerometer chip.
Figure 9B:
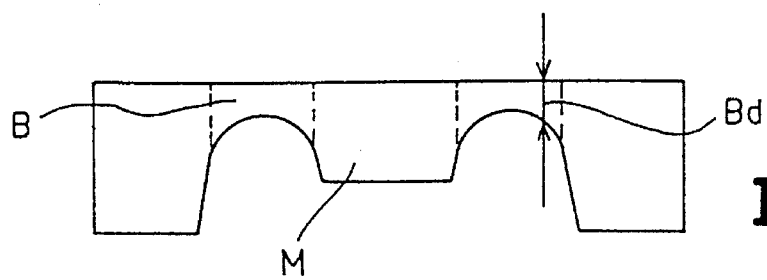
FIG. 9B is a cross-sectional view illustrating in FIG. 9A.

Alternatively, the beam may be structured as illustrated in FIGS. 9A or 9B to increase the strength thereof. Specifically, the width of the beam, Bb, or the thickness of the beam, Bd, may be provided with curvature in such a way that the point at which the fixing part and the beam B contact each other and the point at which the beam B and the proof mass M contact each other, both contacts being subject to intensive stress, are wider or thicker. Furthermore, the structure illustrated in FIG. 9A and the structure illustrated in FIG. 9B may be combined into another structure.

Next, the second aspect of the present invention will be described referring to a specific embodiment.

Figure 10A:
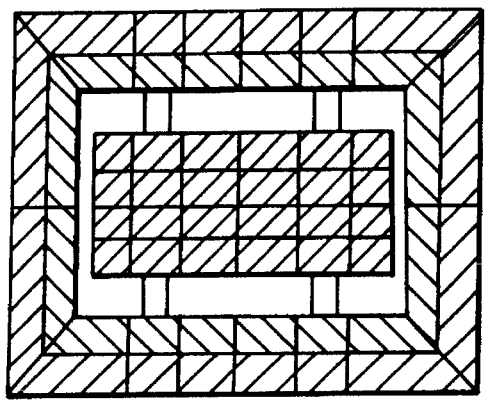
FIG. 10A is a plan view illustrating the accelerometer chip to which the second embodiment of the present invention is applied, and also a structure model view for use in simulation thereof.
Figure 10B:
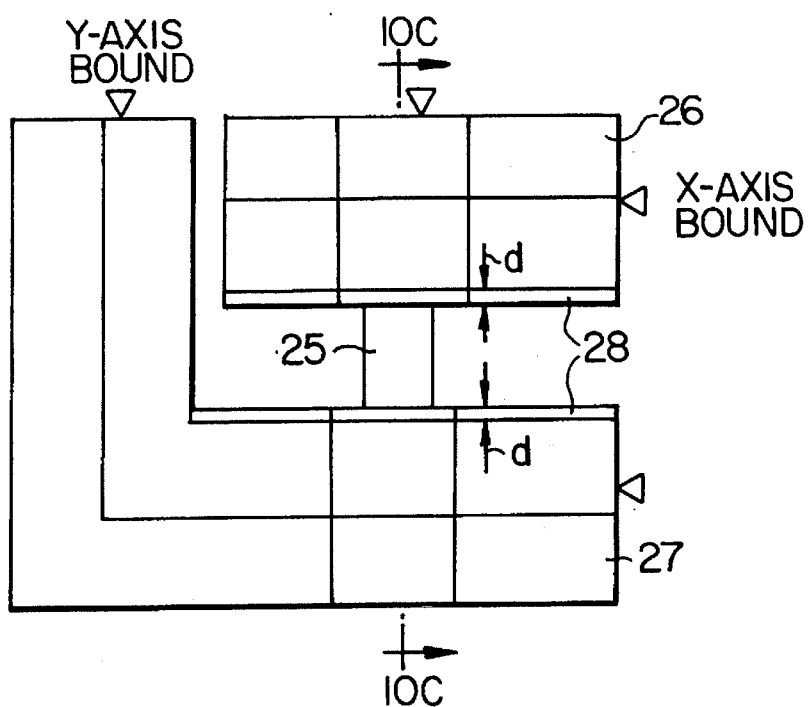
FIG. 10B is a structure model view illustrating the structure of a quarter of the same illustrated in FIG. 10A.
Figure 10C:
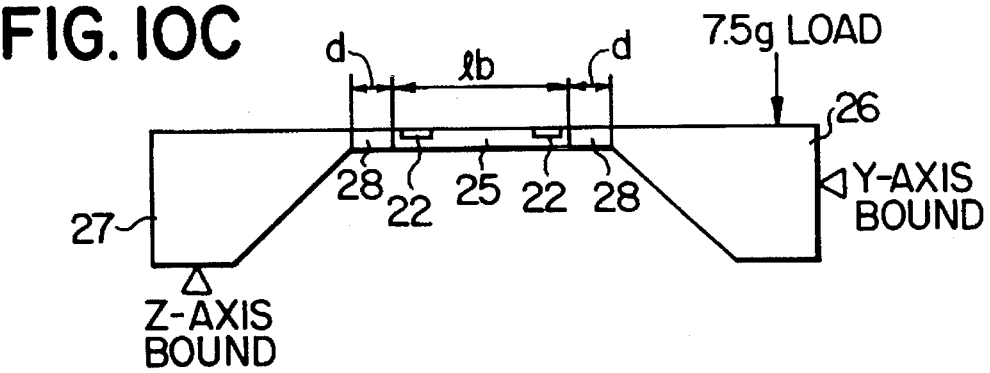
FIG. 10C is a cross-sectional view of the same illustrated in FIG. 10B taken along the line 10C—10C.

FIGS. 10A through 10C illustrate a simulation model which illustrates the structure of the accelerometer chip of a semiconductor accelerometer to which the second aspect of the present invention is applied. A proof mass 26 is suspended by four pieces of beams 25 to a fixing frame 27. Incidentally, FIG. 10A illustrates the entirety of the model, and FIG. 10B illustrates a magnified quarter of the model. The parts denoted by the numeral 28 in FIG. 10B, thin parts connected to the beam 25, are provided along the geometries of the fixing frame 27 and the proof mass 26 at the fixing frame side and the proof mass side respectively. FIG. 10C is a cross-sectional view taken along the line 10C—10C in FIG. 10B. Following piezo resistors 22 disposed at both ends or one end of the beam 25 which constitutes a silicon substrate surface, the thin parts 28 are formed at the outside, i.e., the side of the fixing frame 27, as if extending thereto, and at the side of the proof mass 26 respectively at the same thickness as that of the beam 25. In other words, on the flat surface of the accelerometer chip, the thin parts 28 are formed as if extending the thin area from the width of the beam 25 along the geometry of the proof mass 26 and fixing frame 27. Furthermore, in the cross section taken along the direction of beam suspension, the thin parts 28 are formed in such a way that the thin parts 28 are elongated by the lengths d thereof without changing the length of the beam 25, 1b.

Now, by using the model illustrated in FIGS. 10A through 10C, the oscillation analysis is made by FEM to prove the superiority of this embodiment.

Figure 12A:
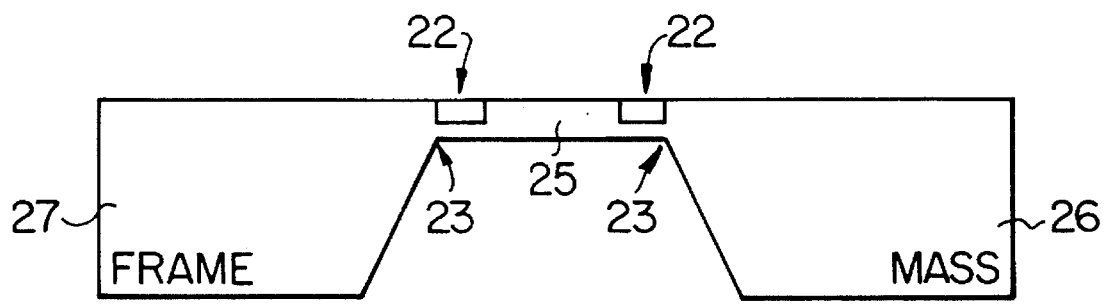
FIG. 12A is a cross-sectional view illustrating the structure of a typical accelerometer chip.
Figure 12B:
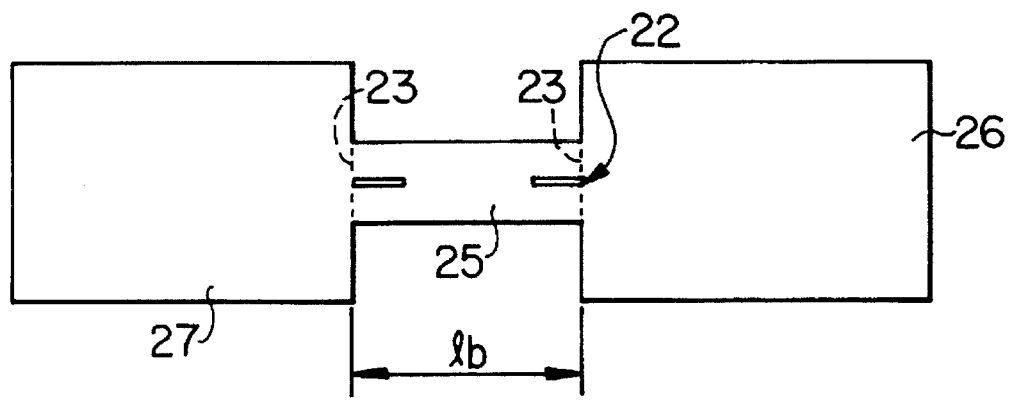
FIG. 12B is a plan view of the same illustrated in FIG. 12A.

The semiconductor accelerometer with piezo resistors is requested to have higher sensitivity and higher fracture strength. In order to improve the sensitivity, it should be so arranged that stress is intensively applied on the location of the piezo resistors, and contradictorily in order to improve the fracture strength, it should be so arranged that the intensive stress is minimized. In order to satisfy both objectives, therefore, piezo resistors should be formed at those parts to which the maximum stress is applied. As illustrated in FIG. 12A, however, since it is extremely difficult to form piezo resistors at the maximum stress applied parts 23, it should be structured so that the difference between the stress applied to the piezo resistor formed parts and the maximum stress generated can be minimized, and also that the intensive stress can be damped and the load up to fracture can be increased.

In order to materialize such structure, the thin parts 28 extending from the beam 25 in the beam width direction is formed. This structure can be materialized without complicating the semiconductor etching process. In this structure, the intensive stress can be dispersed by so arranging that the recessed corners on the rear side of the beam (the maximum stress generation parts) are displaced from the locations of the piezo resistors and the widths thereof extend sideways. Accordingly, the difference in stress value between the main side and rear side of the silicon substrate can be decreased, and the detection efficiency can be improved.

The dimensions of the thin parts 28 are so set that the average stress value of the piezo resistor locations and the stress of the fracture start parts are coincided with each other. As the longer the lengths d of the thin parts 28, the smaller the stress acting on the piezo resistors, there should be the optimum value for the lengths d of the thin parts 28.

Here, description will be given to the simulation computation under the above supposition. Firstly, in order to simplify the computation, as the top end and right end in FIG. 10B are the symmetrical centers of a quarter of the entirety, the top end was supposed to bind the displacement in the Y-axis direction and the right end was supposed to bind the displacement in the X-axis direction. In the same way, the surface corresponding to the bottom of the fixing frame 27 (the bottom of the fixing frame 27 in FIG. 10C) was also supposed to bind the displacement in the Z-axis direction. Incidentally, in actual computation, an FEM software available in the market was used for evaluation, and mesh division was used for division into elements as illustrated in FIG. 10B. Although mesh roughness has an effect on the computation precision, the mesh in this computation was set to a roughness sufficient to grasp the likelihood. The specifications of the accelerometer chip are supposed to be: beam length 250 μm, beam width 110 μm and beam thickness 14.5 μm. A load of 7.5 g was supposed to act on the proof mass 25. With these suppositions, the stress acting on the area where the piezo resistors 22 were disposed and the maximum stress in the vicinity of the beam 25 were computed by varying the lengths d of the thin parts 28.

Figure 11:
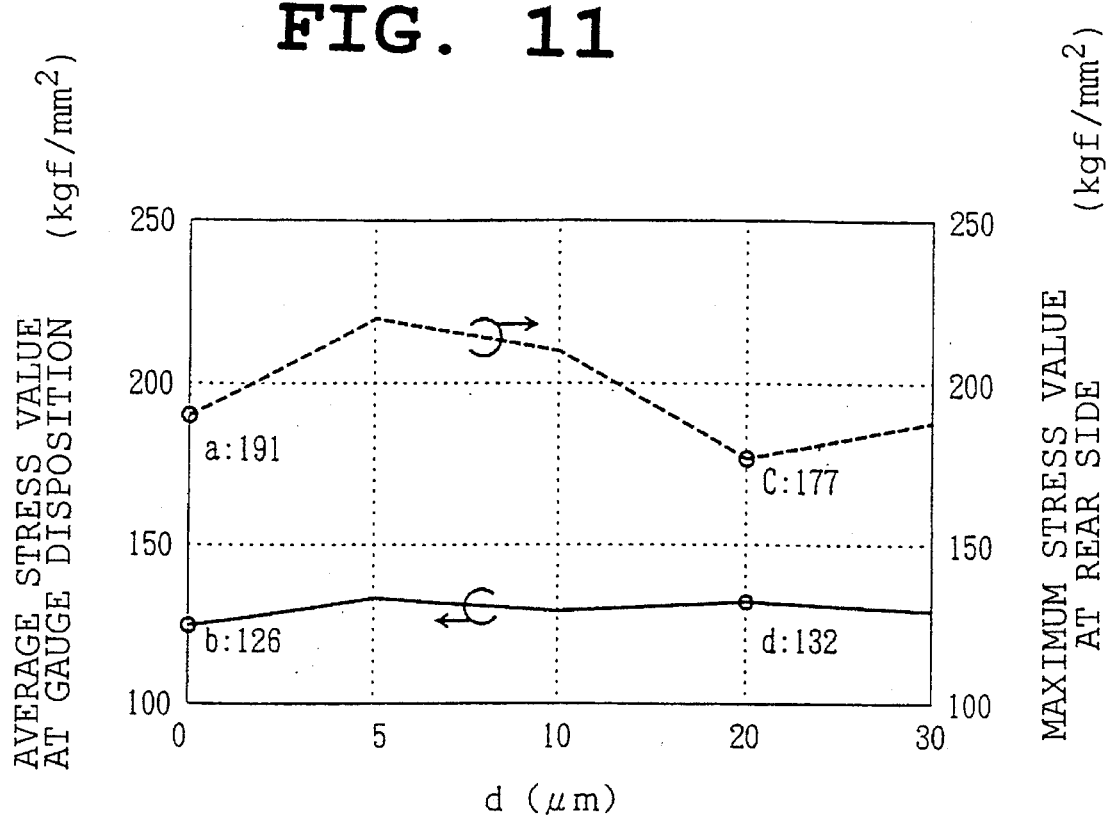
FIG. 11 is a characteristic diagram illustrating the results of stress analysis by finite element method (FEM)

The results of this simulation are summarized in a graph illustrated in FIG. 11. The horizontal-axis denotes the lengths d of the thin parts, and the left end corresponds to a typical structure of the accelerometer chip having no thin part 28. A solid-line data indicate the average stress acting on the locations of the piezo resistors 22 (the maximum stress generation parts at the beam top side), and a broken-line data indicate the maximum stress generated in the vicinity of the corner parts at the beam rear side (interfaces between the thin parts and the thick parts). As a result of this computation, it was found that when the lengths d of the thin parts 28 are 20 μm respectively, the maximum stress was the smallest. In this case, as illustrated in FIG. 11, the fracture strength was improved by 13% when d are equal to 20 μm respectively from the typical accelerometer chip structure with no thin part (computed from $(d/c)/(b/a)=1.13$). Incidentally, the dimensions of the thin part 28, which depend on the beam shape, should be optimized case by case according to the beam shape.

As described in the above, the sensitivity or the fracture strength can be improved by adopting the structure of the accelerometer chip according to the second aspect of the present invention without complicating the manufacturing process in contrast with the conventional structure.

In the assembly structure according to the first aspect of the present invention illustrated in FIGS. 1 through 4, if the accelerometer chip structure according to the second aspect of the present invention illustrated in FIGS. 10A through 10C is employed, the effects of both the structures will work together, and a semiconductor accelerometer which can maintain the required sensitivity more certainly and have high fracture strength sufficient to prevent resonance fracture without using any damping material or any stopper material can be provided.

Incidentally, in the example illustrated in FIG. 10C, the piezo resistors 22 formed on the beams 25 are disposed at a rate of two pieces per beam 25 to form the conventional 8-gauge structure. The present invention is not limited to this structure, but may take a 4-gauge structure illustrated in FIG. 3.

Then, a structure with four piezo resistors will be described.

Figure 13A:
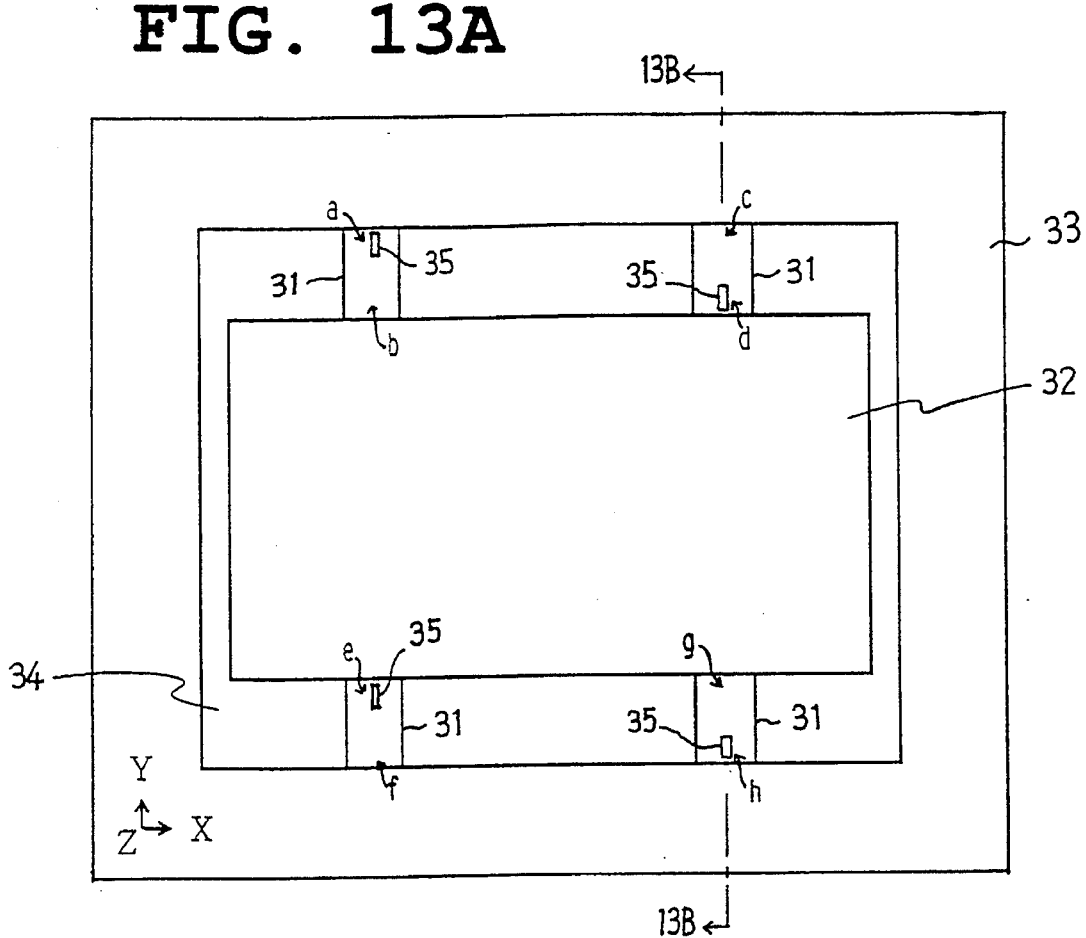
FIG. 13A is a plan view illustrating the accelerometer chip of the first embodiment with the layout of the piezo resistors.
Figure 13B:
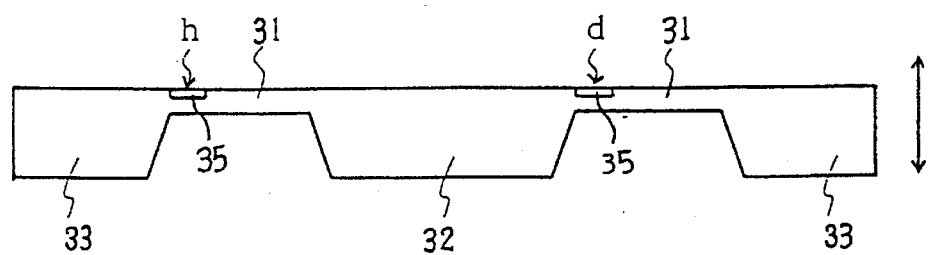
FIG. 13B is a cross-sectional view of the same illustrated in FIG. 13A taken along the line 13B—13B.

FIGS. 3 and 13A are schematic top plan views of the accelerometer chip illustrating the 4-gauge structure as another aspect of the present invention. Hereinafter, this 4-gauge structure will be described referring to FIGS. 13A and 13B. A proof mass 32 is arranged within a space 34 located at the inside of a fixing frame 33. Four pieces of piezo resistors 35 are formed on four pieces of the beams 31 respectively, which are disposed on the X-Y plane to suspend the proof mass 32. The piezo resistors 35 are laid out at four locations a, d, e and h at the respective end parts a through h in such a way that the locations thereof are alternating between the fixing frame side and the proof mass side. The fixing frame 33 and the proof mass 32 are formed by etching a semiconductor wafer. That is, as illustrated in FIG. 13B, the beams 31 which constitute thin parts are formed by etching a semiconductor wafer from the rear side thereof in a cross section taken along the line 13B—13B in FIG. 13A, and the space 34 is formed by leaving the beams 31 by etching the same semiconductor wafer from the top side thereof, whereby the proof mass 32 is separated from the fixing frame 33 and suspended by the four pieces of the beams 31.

Figure 14:
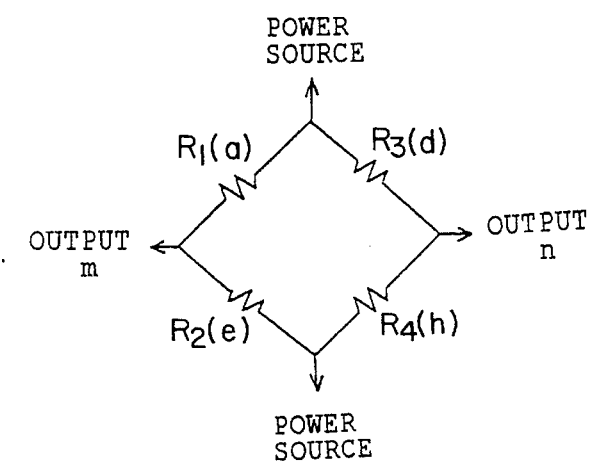
FIG. 14 is a Wheatstone bridge circuit diagram according to the layout of the piezo resistors illustrated in FIG. 13A.

These piezo resistors 35 are connected to form a Wheatstone bridge circuit illustrated in FIG. 14, where the bridge resistances R1(a), R3(d), R2(e) and R4(h) correspond to the piezo resistors 35 laid out in the positions denoted by a, d, e and h respectively in FIG. 13A.

In the structure as described in the above, the beams 31 suspending the proof mass 32 are disposed in such positions that the components other than the detecting axis are minimized considering the oscillation mode of the proof mass 32, which varies according to the detection object and the design of the proof mass including shape and dimensions. In any dimensions, however, there exists a rotational motion which takes the X or Y axis running through the center of the proof mass, and therefore, it is inevitable that signals due to this oscillation mode, i.e., the sensitivity to other axes, should be contained.

As an example, a case where oscillation mode rotating around the Y axis is supposed. In such a movement that the part b moves down while the part d moves up, for example, the piezo resistor in the position a is subjected to stretching force while the piezo resistor in the position e is subjected to compression force. Accordingly, the resistance of the piezo resistor in the position a decreases while the resistance of the piezo resistor in the position e increases. At this time, the piezo resistor in the position d is subjected to stretching force while the piezo resistor in the position h is subjected to compression force, and accordingly, the resistance change of the same relation as the above is caused. As a result, the balance of the bridge illustrated in FIG. 4 is maintained. On the other hand, both the piezo resistors in the positions a and d are subjected to stretching forces and accordingly in the relation of the same resistance change. This is also applicable to a case where the proof mass moves in the reverse rotational direction. That is, if a rotation is caused in the beam length direction, i.e., in the proof mass suspension direction, the piezo resistors disposed in adjacency to each other at the same side with respect to the rotational axis are subjected to resistance changes different from each other, while the piezo resistors disposed in adjacency to and in symmetry with each other with respect to the rotational axis are subjected to the same resistance changes. In the Wheatstone bridge circuit, therefore, the above is exactly represented by the relation in which the balance is maintained with respect to the output terminals, and signal components due to the movement around the Y axis are not outputted to the output terminals.

This relation is also applicable to a case where the proof mass rotates around the X axis. In such a movement that the position b moves up and the position e moves down, for example, the piezo resistors in the positions a and e are subjected to compression forces and consequently the resistances thereof increase, while the piezo resistors in the positions d and h are subjected to stretching forces and consequently the resistance thereof decrease. In this case, the bridge illustrated in FIG. 14 is also maintained. This relation is also applicable to a case where the proof mass rotates in the reverse direction. That is, in a case where the rotation of the proof mass is produced in the direction at right angles to the beam suspension direction, the piezo resistors disposed in adjacency to each other at the same side with respect to the rotation axis has resistance changes of phase reverse to each other, while the piezo resistors disposed in adjacency to and in symmetry with each other with respect to the rotation axis have the same resistance changes. Therefore, in the Wheatstone bridge circuit illustrated in FIG. 14, the above is exactly represented by the relation in which the balance is maintained with respect to the output terminals, and signal components due to the movement around the X axis are not outputted to the output terminals.

As a result, the motion of the proof mass 32 that contributes to the output signals is only the motion in the Z-axis direction illustrated in FIGS. 13A and 13B. In the oscillation in the Z-axis direction, when the proof mass 32 moves up, as the piezo resistors a and h are subjected to compression forces, while the piezo resistors d and e are subjected to stretching forces, resistance changes appear in such a way that each resistance of the bridge illustrated in FIG. 14 loses the balance to a great extent. When the proof mass 32 moves down, the same resistance changes appear. Accordingly, as only the rotational motions of the proof mass 32 around the X and Y axes are possible other than the parallel motion in the Z-axis direction of the proof mass 32, after all for the above reasons, acceleration in only the Z-axis direction can be detected almost correctly.

Figure 15:
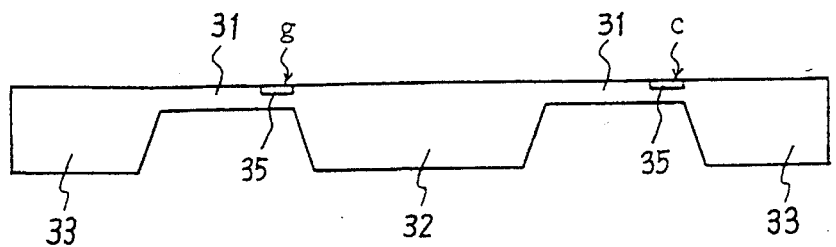
FIG. 15 is a cross-sectional view of a beam illustrating another layout example.

The arrangement of the piezo resistors 35 is not limited to the above, but may also be arranged in various ways. For example, the arrangement of the piezo resistors 35 illustrated in FIGS. 13A and 13B may be displaced to the opposite side with respect to each beam 31 (refer to FIG. 15, a cross-sectional view). That is, in FIG. 13A, it is possible that the piezo resistors 35 are arranged in the positions b, c, f and g, and the piezo resistors 35 arranged in adjacency to each other are connected one by one in a loop to configure a Wheatstone bridge circuit. As this configuration has symmetry, the same effect as the above can be obtained.

Figure 16:
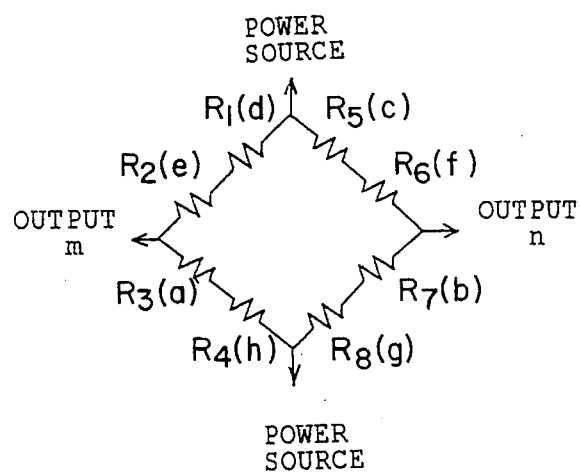
FIG. 16 is a Wheatstone bridge circuit diagram illustrating a typical 8-gauge structure.

Conventionally, in order to offset the sensitivities of the other axes, as proposed in a literature, "Terry, S. C., et al., 'A Miniature Silicon Accelerometer with Built-in Damping,' IEEE Solid-State Sensor and Actuator Workshop (1988), pp. 114–116," a Wheatstone bridge circuit illustrated in FIG. 16 is constituted by using eight pieces of piezo resistors in all the positions a through h. As the Wheatstone bridge circuit is constituted in such a way that the eight pieces of piezo resistors can offset the sensitivities of the other axes within the same pair piezo resistors, a complicated wiring is required with several wires threading through a beam part. This limits the reduction of the beam width. On the other hand, in the 4-gauge configuration according to the present invention, as each beam may include only one piece of piezo resistor and have up to two wires passed therethrough, the beam width can be considerably narrowed, and the accelerometer structure can be compactified.

TABLE I shows the results of the simulation of this 4-gauge structure by FEM. TABLE I also shows the resistance variation of each gauge resistance when the proof mass is displaced with respect to each axis and the directivity of the accelerometer with respect to each axis. Incidentally, each of R1 through R4 in this table correspond to each piezo resistor illustrated in FIG. 14. Furthermore, the directivity D4z with respect to the displacement in the Z-axis direction was computed by using Equation (3), and the directivity D4i (i=X, Y, X+Y) with respect to the other axes was computed by using Equation (4) as a ratio to the directivity in the Z-axis direction.

TABLE I

| Applied axis | δR1 | δR2 | δR3 | δR4 | Directivity (%) |
|---|---|---|---|---|---|
| Z | −0.37 | 0.41 | 0.41 | −0.37 | −1.56 [D4z] |
| X | −0.042 | 0.079 | −0.079 | 0.042 | 0 [D4x] |
| Y | 0.057 | 0.095 | −0.093 | −0.057 | 0.1 [D4y] |
| X + Y | −0.0047 | 0.18 | −0.18 | 0.0047 | 0 [D4x + Y] |

$$D4z = (\delta R1 - \delta R2) - (\delta R3 - \delta R4) \quad (3)$$
$$D4i = \{(\delta R1 - \delta R2) - (\delta R3 - \delta R4)\}/D4z \times 100 \quad (4)$$

For the comparison purpose, TABLE II shows the results of the finite element analysis of a bridge circuit illustrated in FIG. 16 as an 8-gauge configuration. TABLE II also shows the resistance variance of each gauge resistance when the proof mass is displaced with respect to each axis and the directivity of the accelerometer with respect to each axis. Incidentally, each R1 through R8 in this table corresponds to each piezo resistor of the circuit arrangement illustrated in FIG. 16. The directivity D8z with respect to the displacement in the Z-axis direction was computed by using Equation (5), and the directivity D8i (i=X, Y, X+Y) with respect to the other axes was computed by using Equation (6) as a ratio to the directivity in the Z-axis direction.

TABLE II

| Applied axis | δR1 + R2 | δR3 + R4 | δR5 + R6 | 6R7 + R8 | Directivity (%) |
|---|---|---|---|---|---|
| Z | 0.41 + 0.41 | −0.37 − 0.37 | −0.37 − 0.37 | 0.40 + 0.40 | 1.55 [D4z] |
| X | −.079 + .079 | −.042 + .042 | .042 − .042 | .077 − .078 | 0.03 [D4x] |
| Y | −.093 + .095 | .057 − .057 | .057 − .058 | −.098 + .091 | 0.1 [D4Y] |
| X + Y | −.18 + 0.18 | −.0047 + .0047 | 0.12 − 0.12 | −.0047 + .0045 | 0 [D4x + Y] |

$$D8z = \{(\delta R1 + R2 - \delta R3 + R4) - (\delta R5 + R6 - \delta R7 + R8)\}/2 \quad (5)$$
$$D8i = \{(\delta R1 + R2 - \delta R3 + R4) - (\delta R5 + R6 - \delta R7 + R8)\}/2/D8z \times 100 \quad (4)$$

As evident from the directivity columns (corresponding to output) in TABLEs I and II, in both cases where eight pieces of piezo resistors were used and four pieces of piezo resistors are used according to the present invention, the values are significant only for the Z-axis direction, while there are little outputs with respect to the other axes. That is, there is little difference between the 8-gauge structure and the 4-gauge structure. In other words, while the ability to cancel the sensitivities to the other axes is maintained, the number of gauges can be reduced, the gauge wiring can be simplified, the wiring area can be reduced, and the accelerometer can be compactified.

What is claimed is:

1. A semiconductor accelerometer comprising:

a beam;

an accelerometer chip having a proof mass constituting thick areas suspended by said beam; and a casing for housing said accelerometer chip;

wherein a resonant frequency of said beam of said accelerometer chip is controlled so as to be equal to or higher than a frequency of said casing itself within a damping zone for impact transmission.

2. The semiconductor accelerometer according to claim 1, wherein the resonant frequency of said beam of said accelerometer chip is controlled so as to be equal to or higher than a resonant frequency of said casing itself.

3. The semiconductor accelerometer according to claim 2, wherein said beam constructs a double cantilever suspension structure in which beams suspend the proof mass at both ends of said proof mass.

4. The semiconductor accelerometer according to claim 2, wherein a required strength of said beam is set based on a frequency characteristics of the impact acceleration applied to said beams through said casing.

5. The semiconductor accelerometer according to claim 2, wherein a required strength of said beams is set based on a frequency components of the impact acceleration applied to said beams through said casing and a resonance value Q at said frequency components.

6. The semiconductor accelerometer according to claim 3, wherein said double cantilever suspension structure is a structure in which said proof mass is suspended at both ends thereof by four pieces of beams with two pieces of beams at each end.

7. The semiconductor accelerometer according to claim 3, wherein piezo resistors are disposed in the direction of the suspension of said beams at the end parts of said beams, and thin parts which are the same in thickness as and wider in width than said beams are formed continuously to the end parts of said beams.

8. The semiconductor accelerometer according to claim 7, wherein said thin parts are set with respect to end parts of said beams where said piezo resistors are disposed.

9. The semiconductor accelerometer according to claim 6, wherein piezo resistors are disposed at the end parts of said beams in the suspension directions of said beams and thin parts which are the same in thickness as and wider in width than said beam are formed continuously to said end parts of said beams.

10. The semiconductor accelerometer according to claim 6, wherein piezo resistors are disposed at the end parts of said beams in the suspension directions of said beams.

11. The semiconductor accelerometer according to claim 10, wherein said piezo resistors are disposed on four pieces of said beams at a rate of one piece of piezo resistor on one piece of said beams, and said piezo resistors disposed in adjacency to each other are alternatingly disposed at the end parts of the proof mass side and the other side of said beams.

12. The semiconductor accelerometer according to claim 11, wherein said piezo resistors configure a Wheatstone bridge circuit in which said piezo resistors disposed in adjacency to each other are connected to each other to form a loop, and pairs of bridge terminals facing each other constitute output terminals and power source terminals.

13. A semiconductor accelerometer comprising:

a proof mass;

a beam for suspending said proof mass;

a piezo resistor formed at an end part of said beam; and a thin part disposed continuously to said end part of said beam on which said piezo resistor is provided, said thin part being the same in thickness as and wider in width than said beam.

14. A semiconductor accelerometer comprising:

four pieces of beams constituting a double cantilever suspension structure which two pairs are disposed in parallel with each other, each pair thereof being disposed in symmetry with each other with respect to the X and Y axes in the X-Y plane with three-dimensional space orthogonal axes of X, Y and Z;

a proof mass suspended by said four pieces of beams in a space within a fixing frame;

piezo resistors disposed on said beams of double cantilever suspension structure, four pieces of said piezo resistors being disposed on four pieces of said beams of double cantilever suspension structure at a rate of one piece of piezo resistor on one piece of beam and said piezo resistors being alternatingly disposed at end parts of the proof mass side and the fixing frame side of said beams of double cantilever suspension structure; and an output circuit including a Wheatstone bridge circuit constituted by connecting said piezo resistors disposed in adjacency to each other into a loop.

15. A semiconductor accelerometer of a damperless structure comprising:

an accelerometer chip having a beam of a thin thickness, a movable mass of a thick thickness suspended by said beam and a means for detecting a movement of said mass to detect an applied acceleration, all of which are composed of semiconductor substance; and a case for housing and fixing said accelerometer chip therein;

wherein said beam of said accelerometer chip has a dimension which makes a resonant frequency of said beam a certain value equal to or higher than a resonant frequency of said case.

16. The semiconductor accelerometer according to claim 15, wherein said beam constructs a double cantilever suspension structure in which beams suspend said mass at both ends of said mass.

17. The semiconductor accelerometer according to claim 15, wherein said beam has a strength which is set based on a frequency characteristics of an impact acceleration applied to said beam through said case.

18. The semiconductor accelerometer according to claim 15, wherein said beam has a strength to hold against a resonant fracture of said beam.

19. The semiconductor accelerometer according to claim 18, wherein said strength of said beam is set based on a resonant frequency component of an impact acceleration applied to said beam through said case at said resonant frequency of said beam and a resonance value Q.

20. The semiconductor accelerometer according to claim 19, wherein said strength of said beam is larger than a product of said resonant frequency component of said impact acceleration multiplied by said resonance value Q.

21. The semiconductor accelerometer according to claim 17, wherein said beam constructs a double cantilever suspension structure in which beams suspend said mass at both ends of said mass.

22. The semiconductor accelerometer according to claim 20, wherein said beam constructs a double cantilever suspension structure in which beams suspend said mass at both ends of said mass.

23. The semiconductor accelerometer according to claim 21, wherein said double cantilever suspension structure is a structure in which said mass is suspended at both ends thereof by four pieces of beams with two pieces of beams at each end.

24. The semiconductor accelerometer according to claim 22, wherein said double cantilever suspension structure is a structure in which said mass is suspended at both ends thereof by four pieces of beams with two pieces of beams at each end.

25. The semiconductor accelerometer according to claim 15, wherein said detecting means is of a piezo resistor disposed on said beam.

26. The semiconductor accelerometer according to claim 25, wherein said piezo resistor is disposed at a first region where said beam and said mass are connected to each other or a second region where said beam is supported by a fixing part of said accelerometer chip.

27. The semiconductor accelerometer according to claim 26, wherein at least one of said mass and said fixing part proximate to said piezo resistor has a thin part which is the same in thickness as and wider in width than said beam, said thin part being disposed continuously to said beam.

28. The semiconductor accelerometer according to claim 27, wherein said beam constructs a double cantilever suspension structure in which beams suspend said mass at both ends of said mass.

29. The semiconductor accelerometer according to claim 28, wherein said double cantilever suspension structure is a structure in which said mass is suspended at both ends thereof by four pieces of beams with two pieces of beams at each end.

30. The semiconductor accelerometer according to claim 23, wherein piezo resistors are provided on said beams as said detecting means.

31. The semiconductor accelerometer according to claim 30, wherein said piezo resistors are disposed on four pieces of said beams at a rate of one piece of piezo resistor on one piece of said beams, and each of said piezo resistors is located at a portion selected between a mass side and a supported side on a corresponding beam but a different side from an adjacent piezo resistor.

32. The semiconductor accelerometer according to claim 31, wherein said piezo resistors configure a Wheatstone bridge circuit in which said piezo resistors disposed in adjacency to each other are connected to each other to form a loop, and pairs of bridge terminals facing each other constitute output terminals and power source terminals.

33. The semiconductor accelerometer according to claim 24, wherein piezo resistors are provided on said beams as said detecting means.

34. The semiconductor accelerometer according to claim 33, wherein said piezo resistors are disposed on four pieces of said beams at a rate of one piece of piezo resistor on one piece of said beams, and each of said piezo resistors is located at a portion selected between a mass side and a supported side on a corresponding beam but a different side from an adjacent piezo resistor.

35. The semiconductor accelerometer according to claim 34, wherein said piezo resistors configure a Wheatstone bridge circuit in which said piezo resistors disposed in adjacency to each other are connected to each other to form a loop, and pairs of bridge terminals facing each other constitute output terminals and power source terminals.

* * * * *